United States Patent
Lai et al.

(10) Patent No.: US 8,127,731 B2
(45) Date of Patent: Mar. 6, 2012

(54) TAPPET CLEARANCE ADJUSTING COVER COUPLED WITH SECONDARY AIR VALVE

(75) Inventors: Chien-Hung Lai, Renwu Shiang (TW); Chao-Chang Ho, Fongshan (TW)

(73) Assignee: Kwang Yang Motor Co., Ltd., Kaohsiung (TW)

( * ) Notice: Subject to any disclaimer, the term of this patent is extended or adjusted under 35 U.S.C. 154(b) by 721 days.

(21) Appl. No.: 12/289,645

(22) Filed: Oct. 31, 2008

(65) Prior Publication Data
US 2009/0151691 A1 Jun. 18, 2009

(30) Foreign Application Priority Data
Dec. 14, 2007 (TW) ................. 96221294 U

(51) Int. Cl.
*F01N 3/00* (2006.01)
*F01N 3/10* (2006.01)
*F01L 1/14* (2006.01)

(52) U.S. Cl. ............. 123/90.5; 60/293; 60/304; 60/305; 60/306; 123/195 C; 123/198 E; 123/90.52

(58) Field of Classification Search ............ 60/289, 60/293, 304, 305, 306; 123/195 C, 198 E, 123/90.5, 90.52
See application file for complete search history.

(56) References Cited

U.S. PATENT DOCUMENTS

| | | | | |
|---|---|---|---|---|
| 4,417,442 A * | 11/1983 | Ikenoya et al. | ................. | 60/293 |
| 5,657,628 A * | 8/1997 | Takeuchi | ......................... | 60/293 |
| 6,220,020 B1 * | 4/2001 | Takahashi et al. | ............... | 60/293 |
| 7,243,490 B2 * | 7/2007 | Yoshida et al. | ................. | 60/305 |
| 7,757,479 B2 * | 7/2010 | Hirayama et al. | .............. | 60/289 |

* cited by examiner

*Primary Examiner* — Thomas Denion
*Assistant Examiner* — Michael Carton
(74) *Attorney, Agent, or Firm* — Bacon & Thomas, PLLC

(57) ABSTRACT

This invention is to provide a tappet clearance adjusting cover coupled with a secondary air valve. The tappet clearance adjusting cover is disposed on a cylinder head of an engine. The secondary air valve includes a recessed element and a cap which jointly form a receiving space receiving therein a one-way valve. The recessed element is provided with an inlet pipe interposed between the cap and the tappet clearance adjusting cover. By disposing the secondary air valve on the tappet clearance adjusting cover and arranging the inlet pipe between the cap and the tappet clearance adjusting cover, with the one-way valve received in the receiving space of the secondary air valve, heat dissipation can be improved while the one-way valve is protected against premature deterioration and carbon deposition caused by a high-temperature exhaust gas from the cylinder head. Thus, reliability as well as a service life of the one-way valve is effectively increased.

5 Claims, 6 Drawing Sheets

TAPPET CLEARANCE ADJUSTING COVER COUPLED WITH SECONDARY AIR VALVE

FIELD OF THE INVENTION

The present invention relates to a secondary air valve of an engine, and more particularly to a tappet clearance adjusting cover coupled with a secondary air valve, so as to protect a one-way valve of the secondary air valve from premature deterioration and carbon deposition caused by a high-temperature exhaust gas from a cylinder head, and then increase the reliability and service life of the one-way valve and the flexibility and degree of freedom in designing the structure and space inside the cylinder.

BACKGROUND OF THE INVENTION

Referring to FIG. 1, a first conventional secondary air valve of an engine is disposed in a main body 10 of a cylinder head of the engine. The main body 10 is provided with a combustion chamber 101 beneath and an exhaust duct 102 beneath. The exhaust duct 102 has one end communicating with the combustion chamber 101 for discharging an exhaust gas from the combustion chamber 101. The main body 10 has a top provided with a groove 103 while the secondary air valve is fixedly installed above the groove 103. The secondary air valve includes an inlet pipe 11 having an end formed with a pipe opening 111 in communication with the groove 103. A one-way valve 12 including a valve member 121 and a valve opening 122 is installed between the pipe opening 111 and the groove 103 to separate the pipe opening 111 from the groove 103 and form two totally independent spaces. In addition, the main body 10 is internally provided with an air duct 13 configured for communication between the groove 103 and the exhaust duct 102. The air duct 13 is composed of a transverse channel 104, a vertical channel 105 and a slanted channel 106 that communicate with one another. The transverse channel 104 is formed by boring and processing the main body 10 and inserting a blind plug 14 into a bore thus made. Similarly, the vertical and slanted channels 105 and 106 are formed by boring and processing the main body 10 and inserting blind plugs 15 and 16 into corresponding bores thus made. Therefore, the one-way valve 12 is opened toward the exhaust duct 102 only when a suction force sufficient to open the valve member 121 of the one-way valve 12 toward the exhaust duct 102 is generated in the exhaust duct 102. The one-way valve 12 thus opened also introduces a secondary air into the exhaust duct 102 through the pipe opening 111 of the inlet pipe 11 and prevents the exhaust gas in the combustion chamber 101 from flowing back into the inlet pipe 11. Hence, when the secondary air is introduced into the exhaust duct 102 through the inlet pipe 11 and the air duct 13, oxygen in the secondary air is mixed with the exhaust gas. As a result, pollutants in the exhaust gas that have not been completely burnt undergo a further, secondary combustion by virtue of a high temperature of the exhaust gas and with the assistance of the oxygen, thereby reducing the pollutants in the exhaust gas.

However, the first conventional secondary air valve described above has the following defects:

(1) Since the air duct 13 is provided inside the main body 10 and communicates directly with the one-way valve 12, which is spaced from the exhaust duct 102 only by a very short distance, the one-way valve 12 tends to age and deteriorate prematurely due to the high temperature of the exhaust gas released immediately after combustion. This aging and deteriorating process is aggravated by the fact that the exhaust gas is rich in carbon and confirmed within walls of the main body 10 that prevent easy heat dissipation. Moreover, the carbon in the exhaust gas flowing back tends to deposit between the opened valve member 121 and the valve opening 122 so that the valve member 121 becomes stuck and cannot work properly.

(2) The air duct 13, which is composed of the transverse channel 104, the vertical channel 105 and the slanted channel 106, takes up much space in the main body 10 of the cylinder head of the engine and thereby substantially lower the degree of freedom in designing the internal space and structure of the main body 10. Furthermore, the air duct 13 requires a complicated processing procedure that raises the processing and production costs of the cylinder head.

Referring to FIG. 2, a second conventional secondary air valve of an engine includes a secondary inlet valve 3 installed on a plane 23 of a main body 2 of a cylinder head of the engine. The secondary inlet valve 3 includes a valve seat 31, an upper cover 32 and a one-way valve 33. The valve seat 31 is provided with a partition plate 312 for dividing an internal space of the secondary inlet valve 3 into a backflow chamber 311 and a valve member chamber 313. The partition plate 312 is formed with a communication hole 3121 to allow communication between the backflow chamber 311 and the valve member chamber 313. The one-way valve 33 is received in the valve member chamber 313 and covered by the upper cover 32. The valve seat 31 and the upper cover 32 are secured on the plane 23 of the main body 2 with bolts. The upper cover 32 has a top in communication with an end of a secondary air inlet pipe 22. In addition, the main body 2 is provided internally with an air duct 21, whose two ends are connected respectively with the backflow chamber 311 and an exhaust duct 24 in the main body 2. Ambient air entering the secondary air inlet pipe 22 flows sequentially through the upper cover 32, the one-way valve 33, the communication hole 3121, the backflow chamber 311 and the air duct 21, before being discharged via the exhaust duct 24. When an exhaust gas flows back, carbon contained therein will be blocked by the partition plate 312 and retained inside the backflow chamber 311.

The second conventional secondary air valve described above, though capable of reducing backflow of the exhaust gas and thereby preventing failure of the one-way valve 33 due to carbon deposition, is disadvantaged by structural complexity of the valve seat 31. Moreover, the plane 23 through which the valve seat 31 contacts the main body 2 of the cylinder head demands high flatness and high-precision processing, thereby not only raising the difficulty in processing, but also significantly increasing the production cost of the main body 2 and the valve seat 31. In addition, since the valve seat 31 must be divided into the backflow chamber 311 and the valve member chamber 313, and the valve seat 31 must be secured tightly on the main body 2, the degree of freedom in structural design of the valve seat 31 and the main body 2 of the cylinder head is greatly restricted.

Therefore, engine manufacturers of today have endeavored to design a secondary air valve of an engine wherein a one-way valve of the secondary air valve will not experience carbon deposition and premature aging caused by a backflow of a high-temperature exhaust gas from a cylinder head of the engine. It is desired to improve the reliability and service life of the secondary air valve while maintaining a high degree of freedom in designing the cylinder head.

BRIEF SUMMARY OF THE INVENTION

In view of the shortcomings of the abovementioned secondary air valve structures, the inventor of the present invention, after making continuous efforts in relevant research, finally succeeded in developing a tappet clearance adjusting cover coupled with a secondary air valve as disclosed herein, with the aim of effectively solving the carbon deposition and premature aging problems of the one-way valves in the aforesaid conventional secondary air valves on the cylinder heads, so as to improve the reliability and service life of the one-way valves.

An objective of the present invention is to provide a tappet clearance adjusting cover coupled with a secondary air valve, wherein the tappet clearance adjusting cover is disposed on a tappet clearance adjusting hole of a cylinder head and connected with the secondary air valve. The secondary air valve includes a recessed element and a cap which jointly form a receiving space receiving therein a one-way valve. The recessed element is located below the one-way valve and provided with an inlet pipe interposed between the cap and the tappet clearance adjusting cover. By disposing the secondary air valve on the tappet clearance adjusting cover and arranging the inlet pipe between the cap and the tappet clearance adjusting cover, with the one-way valve received in the receiving space of the secondary air valve rather than inside the cylinder head, heat dissipation can be improved while the one-way valve is protected effectively against premature deterioration and carbon deposition caused by a high-temperature exhaust gas from the cylinder head. Thus, reliability as well as a service life of the one-way valve is effectively increased.

Another objective of the present invention is to provide a tappet clearance adjusting cover coupled with a secondary air valve, wherein a one-way valve does not occupy any internal space of a cylinder head so that a structure and space inside the cylinder head can be designed with increased flexibility and a high degree of freedom while a structure of the cylinder head is significantly simplified. In addition, the complicated processing procedures required by the air duct and valve seat of the conventional cylinder head can be avoided to effectively improve the degree of freedom in design.

Yet another objective of the present invention is to provide a tappet clearance adjusting cover coupled with a secondary air valve, wherein the tappet clearance adjusting cover, together with the secondary air valve, is located on an exhaust side of the cylinder head, so as to avoid an otherwise excessively long exhaust pipe, thereby lowering the production cost effectively.

BRIEF DESCRIPTION OF THE SEVERAL VIEWS OF THE DRAWINGS

The invention as well as a preferred mode of use, further objectives and advantages thereof will be best understood by referring to the following detailed description of an illustrative embodiment in conjunction with the accompanying drawings, wherein.

DETAILED DESCRIPTION OF THE INVENTION

Figure 1:
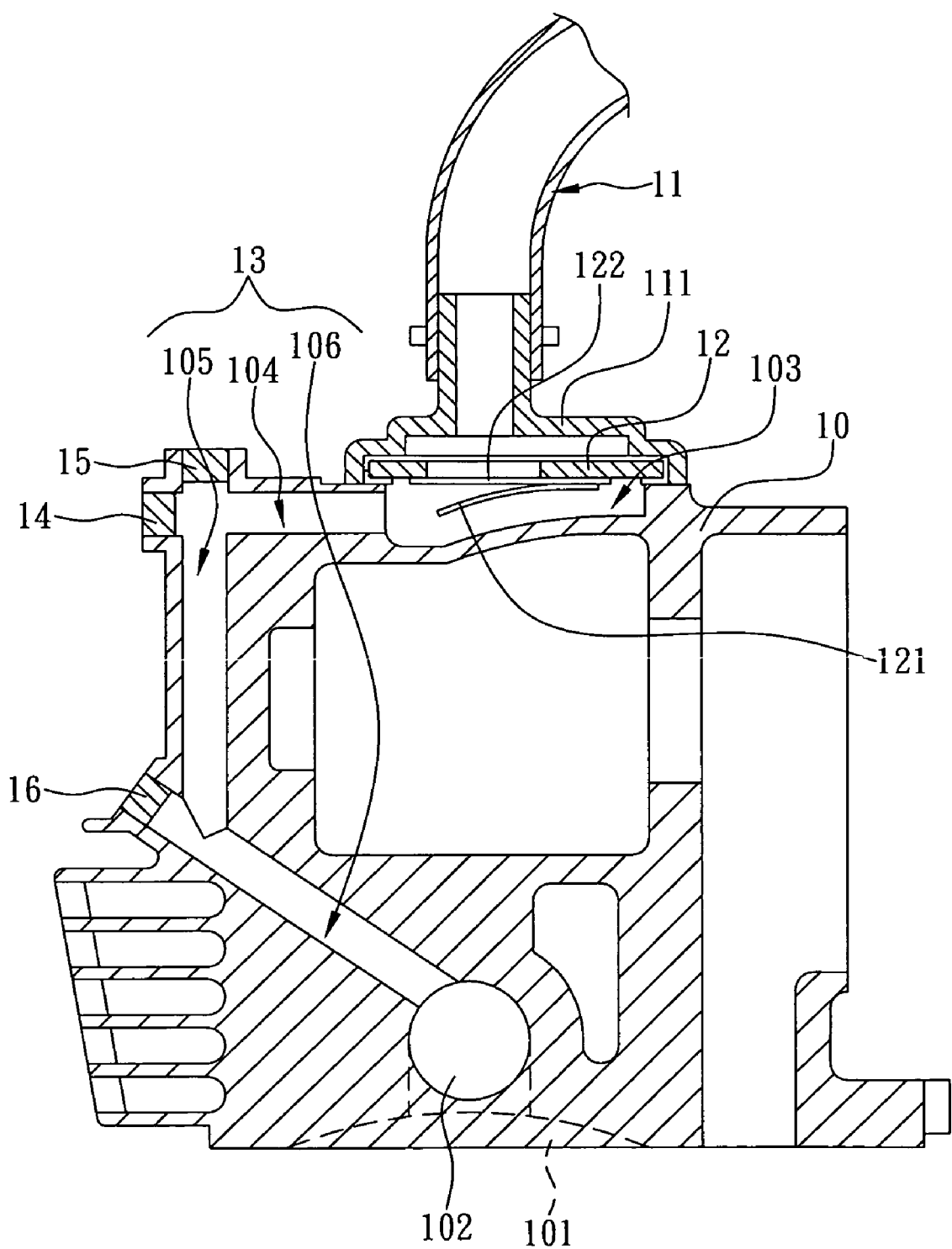
FIG. 1 is a schematic structural drawing showing a first conventional secondary air valve on a cylinder head.
Figure 2:
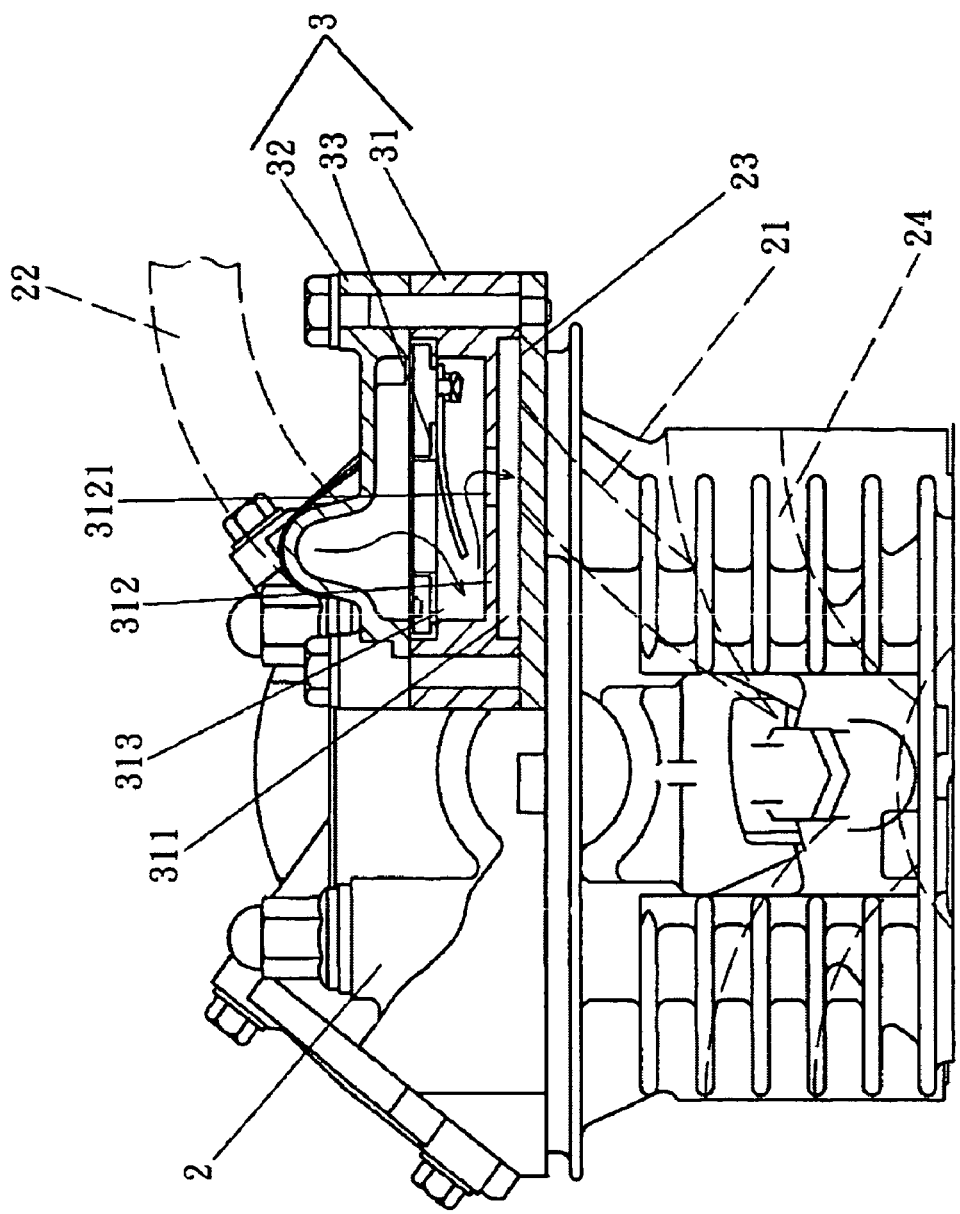
FIG. 2 is a schematic structural drawing showing a second conventional secondary air valve on a cylinder head.
Figure 3:
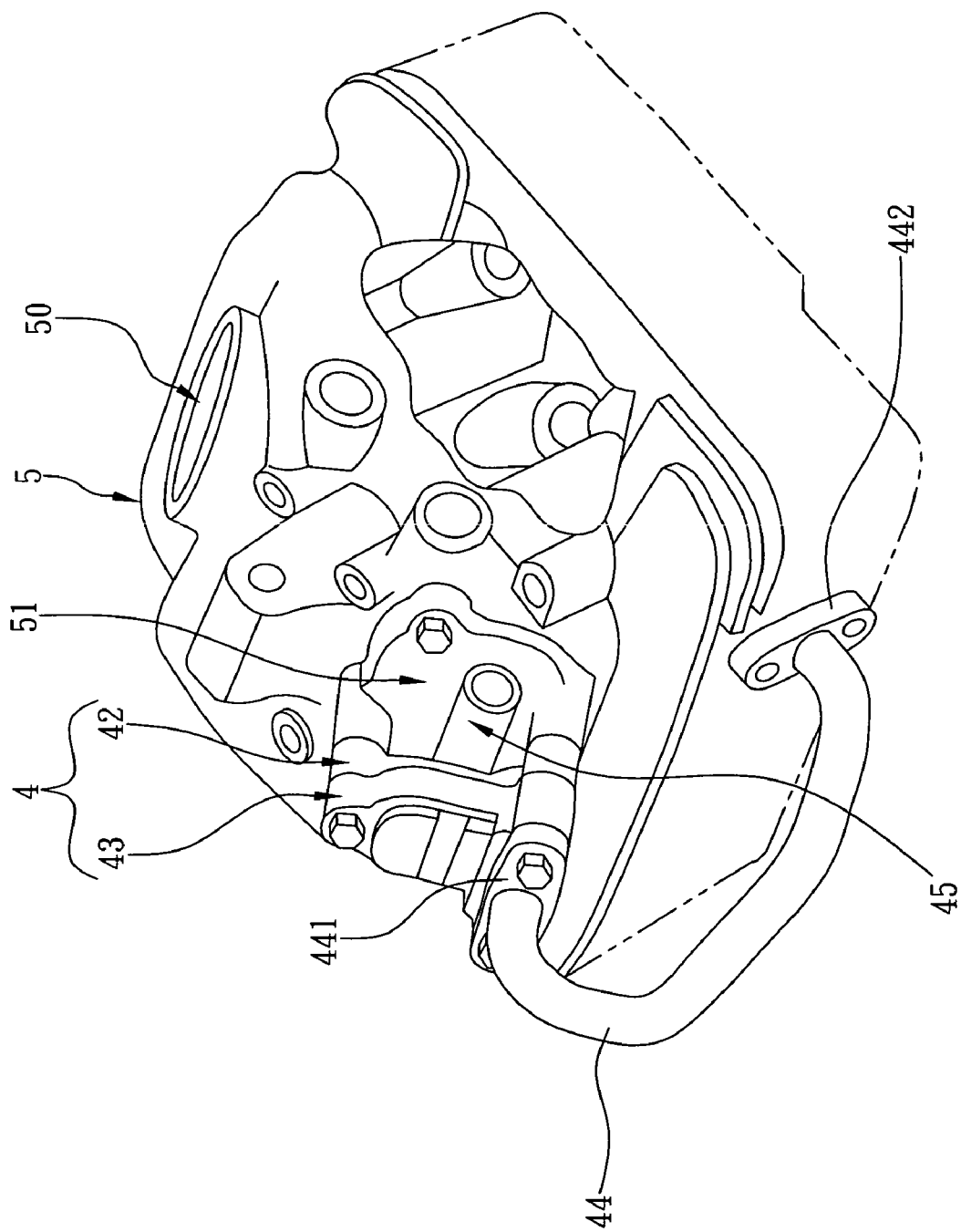
FIG. 3 is a schematic drawing showing a secondary air valve installed on a tappet clearance adjusting cover according to the present invention.
Figure 4:
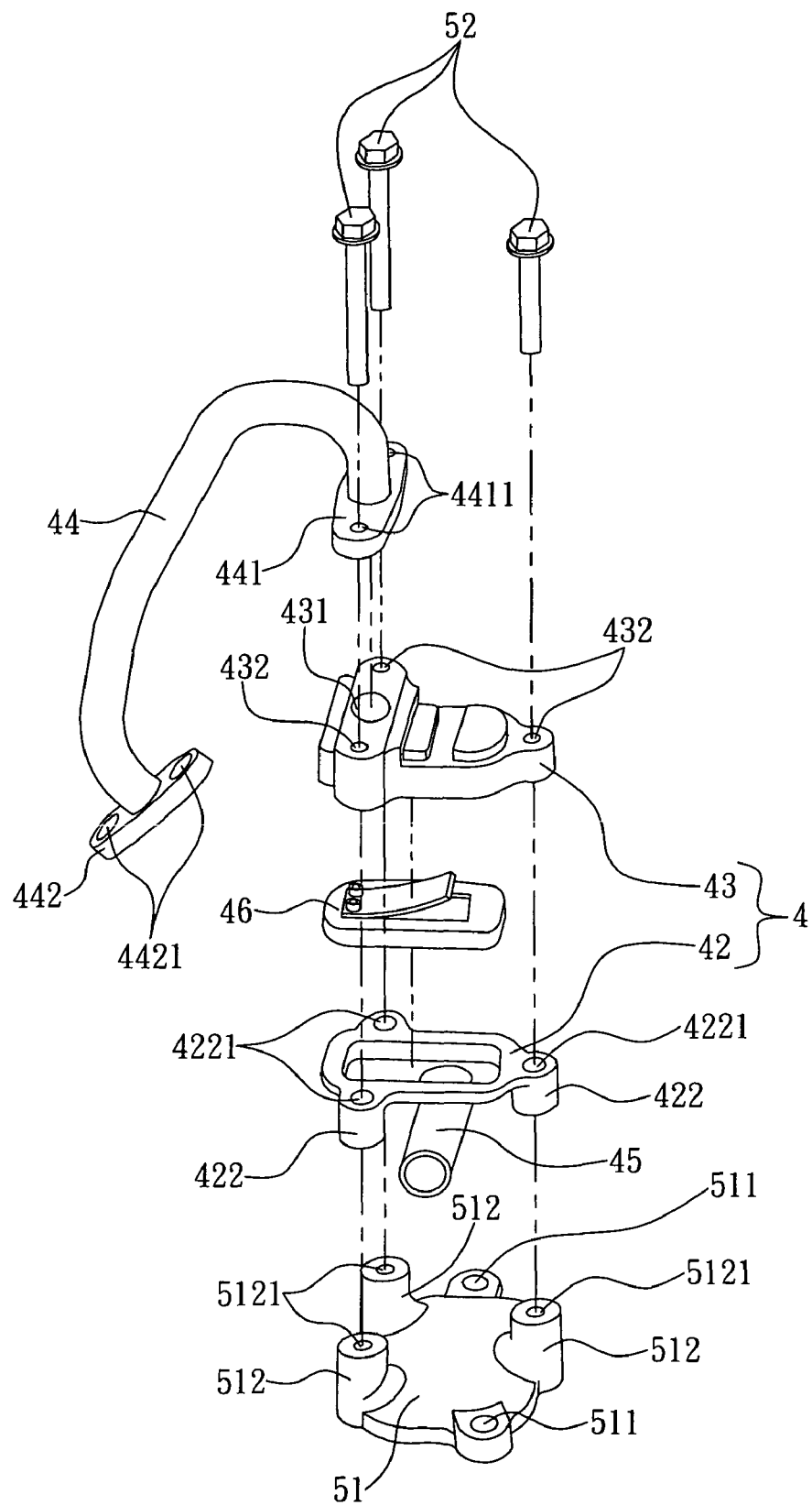
FIG. 4 is a schematic exploded view of the tappet clearance adjusting cover coupled with the secondary air valve according to the present invention.

Referring to FIGS. 3 and 4, according to a preferred embodiment of the present invention, a secondary air valve 4 is installed on a tappet clearance adjusting cover 51 outside a cylinder head 5 of an engine. A top of the cylinder head 5 has an inlet side and an exhaust side, each provided with a tappet clearance adjusting hole 50, wherein the tappet clearance adjusting cover 51 coupled with the secondary air valve 4 is disposed on and completely covers the tappet clearance adjusting hole 50 on the exhaust side of the cylinder head 5. The secondary air valve 4, which is composed of a cap 43 and a recessed element 42, is located and secured on the tappet clearance adjusting cover 51 outside the cylinder head 5. The cap 43 and the recessed element 42 jointly form a receiving space therebetween. The recessed element 42 has one side protrudingly provided with an inlet pipe 45. The inlet pipe 45 is interposed between the cap 43 and the tappet clearance adjusting cover 51. The inlet pipe 45 has one end in communication with the receiving space and the other end connected with an external air inlet hose (not shown) for introducing a secondary air. Further, the cap 43 has a top surface formed with an exhaust hole 431. An exhaust pipe 44 has one end connected with the exhaust hole 431 and the other end extended to and connected with the cylinder head 5, thereby guiding the secondary air into an exhaust duct (not shown). A one-way valve 46 provided in the secondary air valve 4 divides the receiving space into two completely independent spaces and interrupts a passage formed within the secondary air valve 4 between a pipe opening of the inlet pipe 45 and the exhaust hole 431. Only when a negative pressure sufficient to open the one-way valve 46 toward a predetermined single direction is generated in the exhaust pipe 44 will the one-way valve 46 be opened toward the exhaust hole 431, thereby allowing the secondary air to flow sequentially through the inlet pipe 45, the secondary air valve 4 and the exhaust pipe 44 before entering the exhaust duct of the cylinder head 5. Consequently, oxygen contained in an exhaust gas in the exhaust duct can be increased, so that incompletely oxidized pollutants in the exhaust gas can be oxidized again by virtue of a high temperature of the exhaust gas, thereby reducing the pollutants in the exhaust gas.

Figure 5:
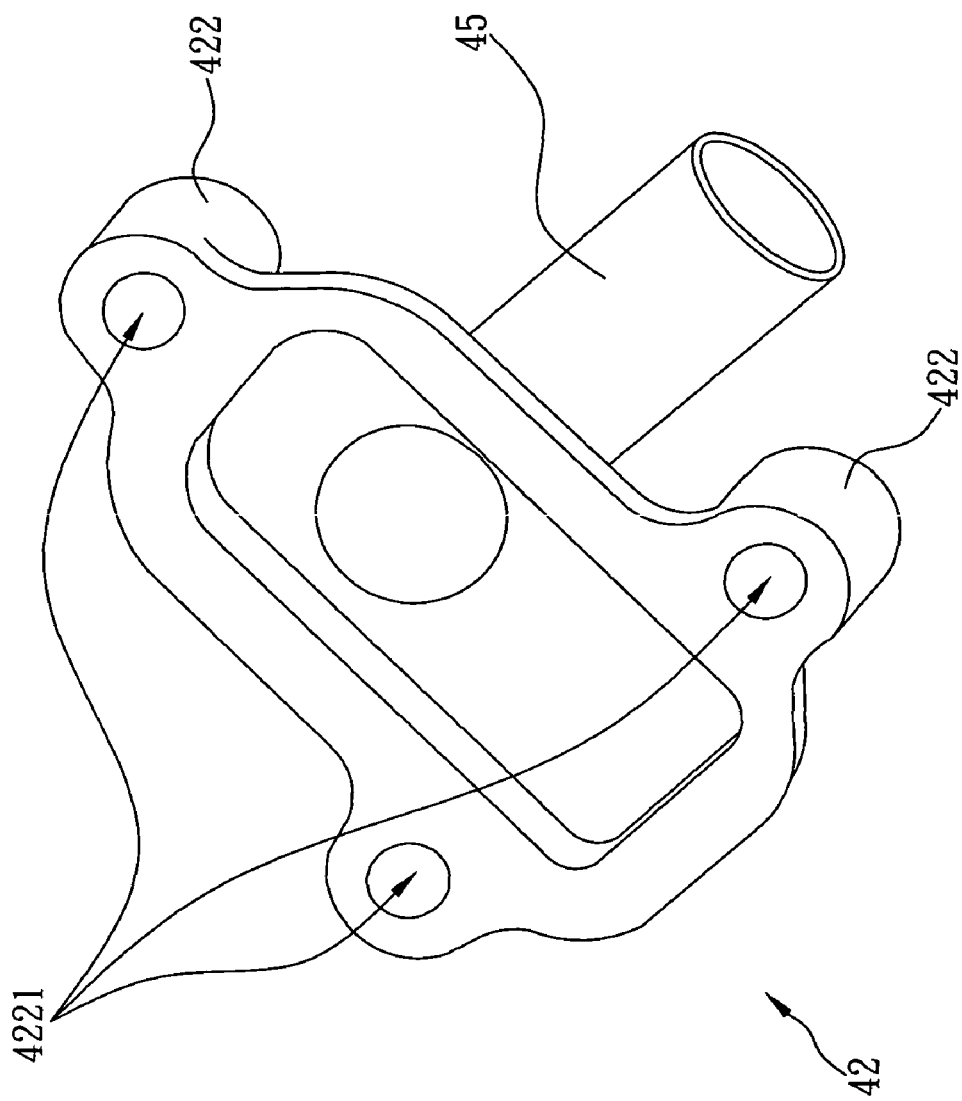
FIG. 5 is a schematic drawing showing a recessed element of the secondary air valve according to the present invention.
Figure 6:
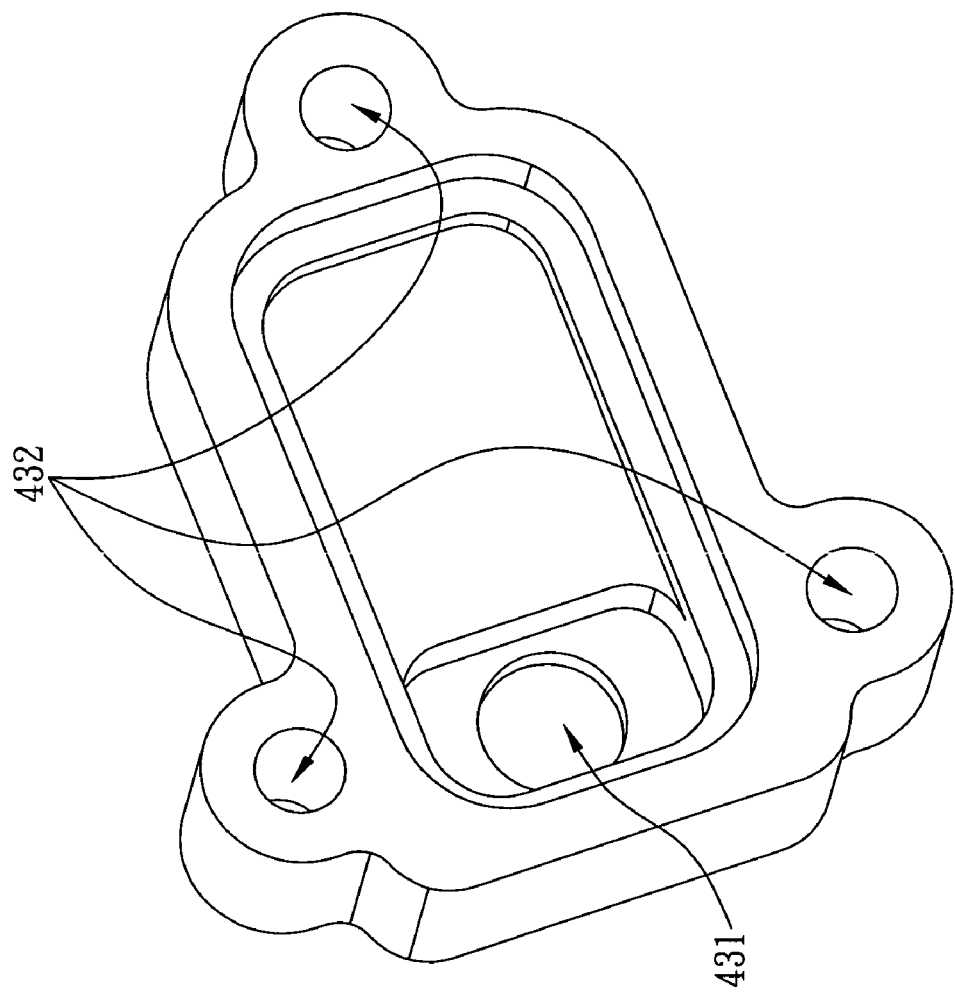
FIG. 6 is a schematic drawing showing a cap of the secondary air valve according to the present invention.

In the foregoing embodiment, referring again to FIG. 4, the tappet clearance adjusting cover 51 has a top surface provided with a plurality of fastening posts 512, each having a top surface formed with a threaded hole 5121. In addition, the tappet clearance adjusting cover 51 is provided with a plurality of assembly holes 511, through which bolts (not shown) can pass to secure the tappet clearance adjusting cover 51 on the cylinder head 5 (as shown in FIG. 3). Referring now to FIG. 5, the recessed element 42 has a bottom surface formed with legs 422 corresponding in position to the fastening posts 512, respectively, wherein each of the legs 422 has a bottom surface provided with an assembly hole 4221 corresponding in position to a matching one of threaded holes 5121. Referring to FIG. 6, the cap 43 has a bottom surface also formed with assembly holes 432 corresponding in position to the assembly holes 4221 of the recessed element 42, respectively. As shown in FIG. 4, the two ends of the exhaust pipe 44 are provided with flanges 441 and 442, respectively, wherein the flanges 441 and 442 are formed with assembly holes 4411 and 4421, respectively. The two assembly holes 4411 on the flange 441 that is adjacent to the cap 43 correspond in position to the two assembly holes 432 on the cap 43. Thus, the secondary air valve 4 can be installed in the following way. First, the one-way valve 46 is placed between the recessed element 42 and the cap 43. Following that, securing elements such as bolts 52 are passed sequentially through the assembly holes 4411, the assembly holes 432 and the assembly holes 4221, and then secured in the threaded holes 5121. Next, another set of bolts (not shown) are passed through the assembly holes 4421 to secure the flange 442 at the other end of the exhaust pipe 44 to the cylinder head 5 (as shown in FIG. 3), thereby completing the installation of the secondary air valve 4 on the tappet clearance adjusting cover 51 of the cylinder head 5.

In the foregoing embodiment, the secondary air valve 4 is located outside the cylinder head 5 and away from the exhaust duct in the cylinder head 5. Therefore, compared with the prior art, not only is heat dissipation more efficient, but also the one-way valve 46 is far less likely to be affected by the high-temperature exhaust gas from the cylinder head 5, thereby effectively protecting the one-way valve 46 against premature aging and carbon deposition. In consequence, the one-way valve 46 can have a longer service life to make the resultant engine product more reliable and reduce customer complaints. Furthermore, the one-way valve 46 can be repaired and replaced without having to disassemble the cylinder head 5, thereby saving a lot of time and labor in the maintenance work. Besides, as the secondary air valve 4 does not occupy any internal space of the cylinder head 5, the cylinder head 5 can have its structure simplified and its production cost lowered. In the event that the secondary air valve 4 is to be installed on an engine that is not designed for such a valve, all that needs to be done is to modify the design of the tappet clearance adjusting cover 51 to allow installation of the secondary air valve 4. Thus, the degree of freedom in design is also enhanced.

In conclusion, the tappet clearance adjusting cover coupled with the secondary air valve according to the present invention has the following advantages:

1. By disposing the secondary air valve 4 on the tappet clearance adjusting cover 51 and arranging the inlet pipe 45 between the cap 43 and the tappet clearance adjusting cover 51, with the one-way valve 46 received in the receiving space of the secondary air valve 4 rather than inside the cylinder head 5, heat dissipation can be improved while the one-way valve 46 is protected effectively against premature deterioration and carbon deposition caused by the high-temperature exhaust gas from the cylinder head 5. Thus, reliability as well as the service life of the one-way valve 46 is effectively increased.

2. Since the one-way valve 46 does not occupy any internal space of the cylinder head 5, the structure and space inside the cylinder head 5 can be designed with increased flexibility and a high degree of freedom while the structure of the cylinder head 5 is significantly simplified. In addition, the complicated processing procedures required by the air duct 13 and valve seat 31 of the conventional cylinder head can be avoided to effectively improve the degree of freedom in design.

3. The secondary air valve 4 is coupled to the tappet clearance adjusting cover 51 on the exhaust side of the cylinder head 5, so as to avoid an otherwise excessively long exhaust pipe 44, thereby lowering the production cost effectively.

While the invention has been described by means of specific embodiments, numerous modifications and variations could be made thereto by those skilled in the art without departing from the scope and spirit of the invention set forth in the claims.

What is claimed is:

1. An inlet and outlet structure above a cylinder head comprising;
    a tappet clearance adjusting cover having a bottom side disposed on a tappet clearance adjusting hole of a cylinder head;
    a secondary air valve comprising a recessed element and a cap wherein a bottom side of the recessed element is coupled to a top side of the tappet clearance adjusting cover, a bottom side of the cap is coupled to a top side of the recessed element for forming a receiving space between the cap and the recessed element, and the cap and the recessed element are formed with assembly holes at corresponding positions thereof respectively;
    a one-way valve received in the receiving space;
    an inlet pipe coupled to the recessed element at a position between the bottom side of the recessed element and the top side of the tappet clearance adjusting cover; and
    a plurality of securing elements passing through the corresponding assembly holes for securing the cap and the recessed element of the secondary air valve to fastening posts disposed at the top side of the tappet clearance adjusting cover respectively.

2. The inlet and outlet structure above the cylinder head as claimed in claim 1, wherein the cap is provided with an exhaust hole connected with an exhaust pipe, through which a secondary air can be introduced into an exhaust duct of the cylinder head.

3. The inlet and outlet structure above the cylinder head as claimed in claim 1, wherein the tappet clearance adjusting cover coupled with the secondary air valve is located on an exhaust side of the cylinder head.

4. The inlet and outlet structure above the cylinder head as claimed in claim 1, wherein the securing element is a bolt.

5. The inlet and outlet structure above the cylinder head as claimed in claim 1, wherein the assembly holes of the recessed element are formed on legs of the recessed element.

\* \* \* \* \*